United States Patent [19]

Levine

[11] 4,336,524

[45] Jun. 22, 1982

[54] VIDEO DISPLAY PAGER RECEIVER WITH MEMORY

[76] Inventor: Alfred B. Levine, 2924 Terrace Dr., Chevy Chase, Md. 20015

[21] Appl. No.: 148,877

[22] Filed: May 12, 1980

Related U.S. Application Data

[62] Division of Ser. No. 58,250, Jul. 17, 1979, Pat. No. 4,263,480.

[51] Int. Cl.³ .......................... G08B 5/22; H04B 7/24; H04M 11/00
[52] U.S. Cl. .............................. 340/311.1; 179/2 EC; 340/825.44; 455/31
[58] Field of Search ................ 340/311, 312; 179/2 E, 179/2 EC; 455/31, 38

[56] References Cited

U.S. PATENT DOCUMENTS

| | | | |
|---|---|---|---|
| 3,914,692 | 10/1975 | Seaborn | 340/311 |
| 4,103,107 | 7/1978 | D'Amico et al. | 340/311 |
| 4,145,684 | 3/1979 | Stodolski | 340/311 |
| 4,160,240 | 7/1979 | Partipilo | 340/311 |
| 4,197,526 | 4/1980 | Levine et al. | 340/311 |

Primary Examiner—James J. Groody

[57] ABSTRACT

A fully automatic pager system wherein a transmitter station automatically sends out an identifying address code to activate a selected pager receiver in response to a telephone call from a calling party who dials the normal telephone number of the party to be reached. The transmitter station also automatically sends out a message code to the activated receiver in response to a number message subsequently dialed by the calling party. The transmitter station automatically responds to the dialed identifying message and the dialed message from the caller to locate the identify code and the message code to be transmitted that have been previously stored in a memory. At the receiver is provided a memory having a series of pre-stored limited content messages, each of which is selectively retrievable upon the receipt of a message code corresponding to the address of that message in the memory. The received message codes are automatically stored in the receiver, for subsequent retrieval, in the event that the user does not acknowledge receiving that message.

8 Claims, 3 Drawing Figures

VIDEO DISPLAY PAGER RECEIVER WITH MEMORY

RELATED APPLICATIONS

This application is a division of co-pending application Ser. No. 58,250, filed July 17, 1979, now U.S. Pat. No. 4,263,480 issued Apr. 21, 1980.

STATEMENT OF THE INVENTION

This invention relates to completely automatically operating pager systems wherein radiant transmissions of limited content messages in coded form are forwarded to selected subscribers from a central station, and the corresponding messages are displayed on the video panel of a portable receiver carried by the subscriber. This invention also relates to improvements in such pager receivers having memories for prestoring such messages, automatic entry of the codes, selective retrieval of messages, and other features.

BACKGROUND

In an earlier U.S. Pat. No. 4,197,526, there is provided an automatically operating pager system wherein a transmitting station automatically receives and transmits limited content coded signals from callers, and automatically sends out corresponding messages to remotely located receivers. The pager receivers includes a video display panel for displaying the limited content messages, and a memory for storing the messages for later retrieval and display at the discretion and at the convenience of the user. The page receiver provides for automatic storage of any of a plurality of such received messages, such as call-back telephone numbers, and selective manual or automatic retrieval and video display of such plural messages at the convenience of the user, as well as an audible alert of a paging call, automatic time delayed storage, and other features.

SUMMARY OF THE INVENTION

According to the present invention, the transmitter station may comprise a central broadcast station and serve a much greater number of subscribers, at greater distance from the station. It also provides completely automatic operation in paging such subscribers and transmitting messages thereto in response to a much greater number of callers. In a preferred embodiment, each of the callers is automatically instructed to not only inform the central station of the limited message to be sent by dialing or otherwise digitally transmitting the alpha-numeric message on the calling telephone, but is also automatically instructed to digitally identify the desired subscriber, such as by digitally sending the subscriber's telephone number to the central station. At such station the subscriber's page code address is automatically looked-up and determined from the received subscriber's telephone number and this page code address is transmitted to activate the selected subscriber's portable page receiver. Additionally at such transmitter station, a message address code corresponding to a call-back number is automatically located, and this address code is also automatically transmitted to the page receiver.

The portable page receiver is provided with a memory containing a series of such limited content messages, such as a plurality of call-back telephone numbers, and each number is stored at a different address in the receiver memory. Therefore upon receiving the transmitted message address code from the central transmitter, the selected limited content message is automatically retrieved from the memory and automatically displayed on the video panel of the receiver in real-time when the transmission is received, or is remembered and retrievable at a later time at the convenience or availability of the subscriber.

DETAILED DESCRIPTION OF A PREFERRED EMBODIMENT

Figure 1:
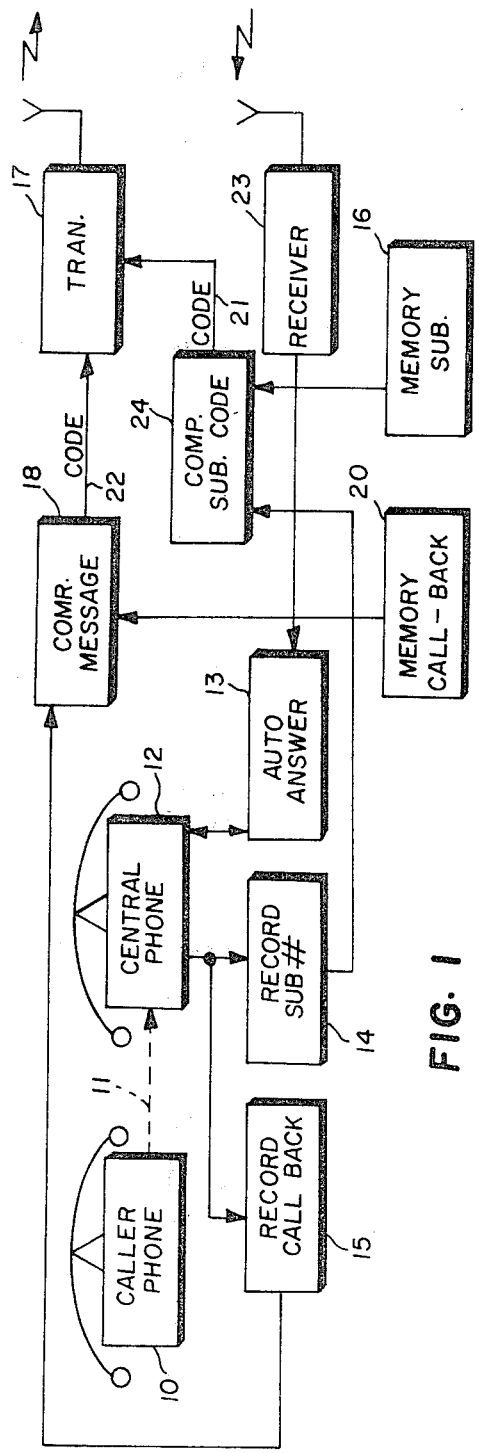
FIG. 1 is a functional block diagram showing the automatic operation of the Central Station and transmitter for receiving calls and transmitting limited content messages to selected ones of many pager receivers.

Referring to FIG. 1, the overall system comprises a common Central Station 12, or stations, that is adapted to receive at random telephone calls from one or many callers 10 who wish to have paged selected ones of the many subscribers to the system. Depending upon the scope of the system, including the number of subscribers, the Central Station is provided with many incoming telephone circuits 11 that can receive calls sequentially or simultaneously from outside callers. At the station 12, there is provided a sufficient number of automatic telephone answering devices 13, connectable to the various phone circuits 12, to accomodate a reasonable number of simultaneously received incoming calls. The telephone answering devices 13 are of conventional construction, and contain prerecorded messages briefly informing the caller about the nature and interactive operation of the system. According to a preferred mode of operation, the caller is first instructed to dial, touch tone, or otherwise send the telephone number of the selected party to be paged, and this seven digit digital number is received and recorded as a digital series of pulses or tones on a magnetic recorder 14 associated with that answering device 13. Following this initial automatic reception of a selected subscriber's phone number, the caller is then automatically instructed by prerecorded message from telephone answering device 13 to then dial, touch tone or send a desired call-back telephone number, or limited message, that the caller wishes to be transmitted to the subscriber. This second seven-digit call-back number, or limited message, is also recorded at the central station at a magnetic recorder 15, that may be combined with recorder 14. Thus the Central Station operation is completely automatic in nature, using prerecorded instructions to each caller, and having the caller then identify the subscriber or called party to be reached by dialing an identifying digital number, and also dialing a second digital number corresponding to a limited content message to be transmitted to that subscriber, e.g., the person carrying the remote portable page receiver.

As will be described, each portable page receiver is activated or selected by the transmitter station automatically sending a unique digital identifying code. The number of digits required for such identify code corresponds to the number of subscribers to the system. Thus if the number of subscribers is only 100 or less, a three digit or three place code (if in the decimal system) is sufficient. For 1000 subscribers or less, a four place decimal address code is sufficient to uniquely identify each subscriber by a different transmitted code number. The Central Station assigns a different subscriber address code to each different page receiver, and at the Central Station is provided a memory 16 for storing each subscriber's own seven digit telephone number together with an assigned three, four, or five (or other) digit subscriber address code number.

Upon the Central Stations receiving a call for a page, and upon receiving and recording the subscriber's telephone number from the calling party, the Central Station automatically correlates the received and recorded telephone number from recorder 15 with its stored memory of all subscriber telephone numbers, and automatically locates the unique subscriber address code number. Having automatically located the subscriber address code, a pulse code corresponding thereto is directed to modulate radio transmitter 17 and the modulated radio transmission is radiated to the remote pager receiver to activate the selected receiver.

In a similar manner, the dialed call-back telephone number or limited message, that has been received from the caller and magnetically recorded in recorder 15 is directed to a comparator 18. The comparator 18 includes an extensive memory bank that contains for each subscriber, a list of pre-stored call-back telephone numbers, or other limited messages, together with a unique address code number associated with each said call-back telephone number. The identifying subscriber address code number that is conveyed over 21 to modulate the transmitter 17 and activate the selected remote page receiver, is also directed over to a mass memory 20 to select that portion of the mass memory storage 20 that has been previously allocated to that particular subscriber. Having located that subscriber's section of the mass memory 20, the recorded call-back telephone number, or other message, received from the caller is then compared or correlated with the pre-stored phone numbers or limited messages that have been pre-inserted into the memory 20, and in the event a correlation is obtained, a message address code corresponding to such message is located and directed over 22 to modulate the radio transmitter 17 for propagating the derived message address code to the remote subscriber.

Thus, in automatic response to the calling party first dialing the subscriber's phone number, followed by dialing a call-back phone number, or other message, the Central Station looks-up the subscriber's paging address code and automatically transmits this code to activate the selected one of the page receivers. Additionally, the Central station responds to the caller's dialing a call-back number, or other limited message, to look up in its mass memory 20 whether that phone number or message has been pre-stored by that subscriber, and, if so, a pre-assigned unique message code is sent out by transmitter 17 to the activated subscriber's page receiver.

Figure 2:
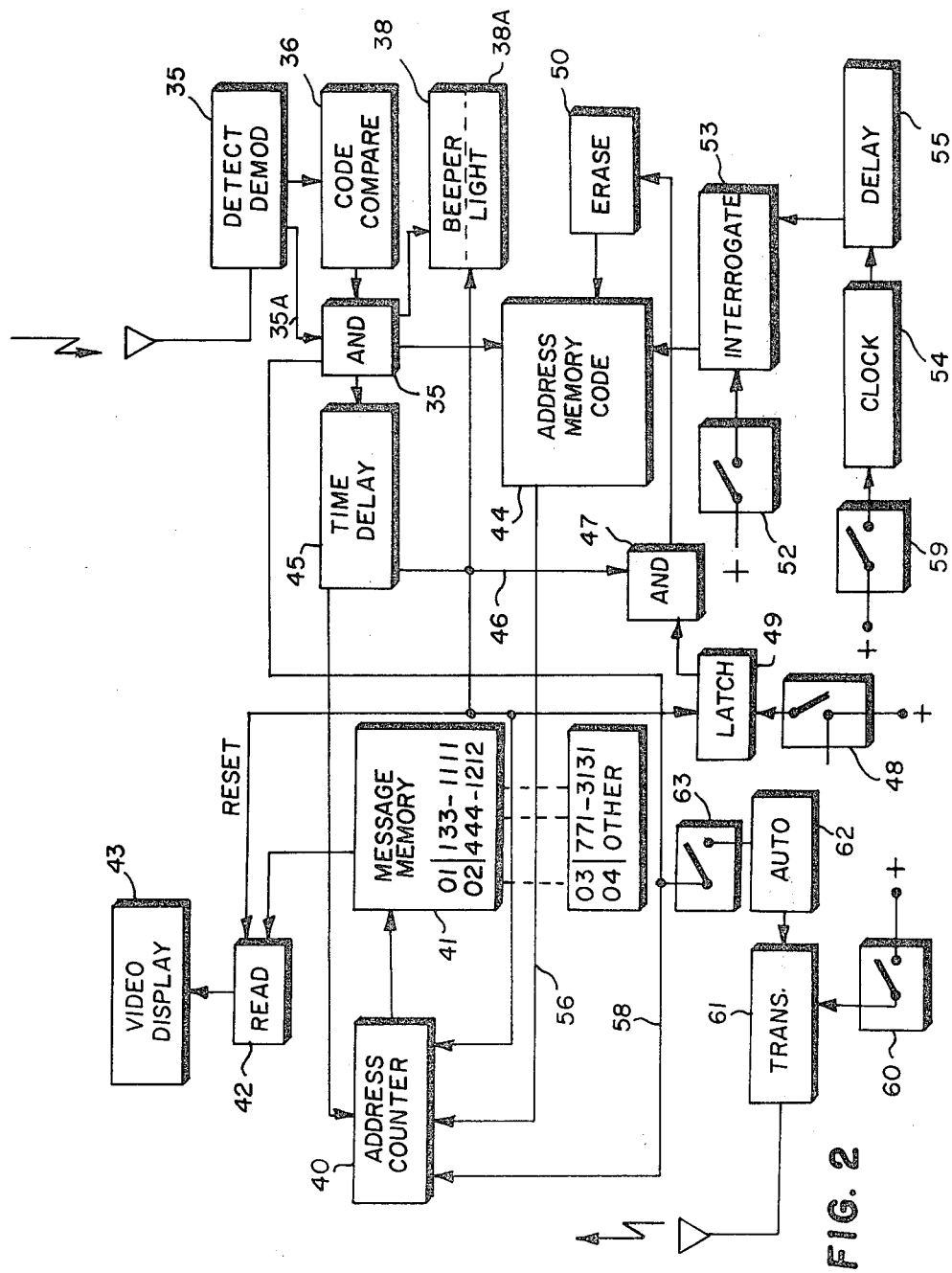
FIG. 2 is a functional block diagram illustrating details of a preferred pager receiver.

The page receiver, shown in FIG. 2, contains a video display panel 43, for displaying a limited message in alphanumeric form, an audio beeper 38, and/or a flashing light 38a, both or either for signaling when a message has been received from the remote transmitter station.

Referring to FIG. 2, the incoming code received from the transmitter station 17 is initially detected and demodulated at 35, and then compared at 36 with the unique subscriber code that has been assigned to that particular pager receiver. In the event of coincidence, an AND circuit 37 is energized, signaling that the pager receiver is to respond to a message. Upon subsequently receiving, detecting and demodulating the message code from the transmitter over line 35a, the AND circuit initially energizes the audible beeper 38 and/or the flashing light 38a to signal the user that a message is being received.

As will be recalled, the received limited message is in the form of but a few numerical digits, sequentially transmitted from the transmitter station. This received digital code is directed from the AND circuit 37 to an address counter 40 over line 58 where the received pulses are summed to select a corresponding numerical address in a message memory 41. In a preferred embodiment, the message memory 41 is a small size, electronic chip circuit, such as a bubble memory, or other available on-the-shelf circuit, into which has been pre-entered and prestored a series of about one hundred different seven digit call-back telephone numbers, or a corresponding number of other limited content messages, each of which is individually addressable and retrievable by a different address code number. The address counter 40 therefore receives the pulses summing a two digit code number from the transmitter station 17, and in response thereto, addresses that corresponding address or section of the message memory 40 to retrieve a pre-stored seven digit message at that selected address. The retrieved seven digit message is read-out by the circuit 42 and applied to the video display panel 43, to visually display the retrieved seven digit call-back telephone number, or other limited message.

Thus, the pager receiver is initially activated for operation by first receiving its unique subscriber address code number; and upon subsequently receiving a two-digit message code, it signals the user of an incoming message by the beeper or flashing light, and it then retrieves a pre-stored seven digit message from its message memory 41 corresponding to the message code and displays that retrieved message on its video display panel 43.

In the event that the overall system accomodates a total of one thousand subscribers, with each receiver storing up to one hundred call-back telephone numbers or other limited messages, a total of only five digits are required to be transmitted from the transmitter station in order to communicate a message of seven digits in length [such as a call-back telephone number], not including, of course, synchronization or other signals that may be required for control purposes.

Returning to FIG. 2, the incoming message code is also directed to an address memory 44 where that two digit message code is remembered or stored, and the initial pulse of that message code is further directed to a fixed time delay circuit 45 to commence a fixed time delay of one minute or other short time interval. At the conclusion of that fixed time delay, the circuit 45 produces an erase pulse over line 46 to reset the address counter 40, erase the video display 43 by resetting the readout circuit 42, to turn off the beeper 38 and/or the flashing light indicator 38a, and to energize the AND circuit 47. The result of all of these actions is to reset the receiver to a condition for receiving and displaying a subsequent message from the transmitter station, but to "remember" the previously received message code that has been stored in the address memory 44, as described above. Therefore in the event that the user is otherwise occupied and does not respond to the received message on the display panel 43, the content of that message, [in the form of its received two digit message code] is stored or remembered in the message memory 44 and may be subsequently retrieved, as will be described.

However, in the event that the user has received and noted the display of the call-back telephone number or other limited message, the user may depress an acknowledge button switch 48 on the keyboard of the pager receiver. This energizes a latch circuit 49 that, in turn, energizes the AND circuit 47. Upon the subsequent generation of the time delayed reset and erase pulse by the time delay circuit 46, and AND circuit 47 is activated to energize the erase circuit 50, thereby to erase the previously stored address code in the address memory 44.

In the event that the user is not available, of for other reason is unable or unwilling to respond, the audio beeper 38 and/or flashing light 38a may be manually disconnected and the receiver may be completely ignored by the user and operate in an automatic manner. In such event as each succeeding message code is received from the transmitter station, the corresponding message is displayed on the video panel 43, and then automatically erased after a fixed time as described above, but the message code is also stored in the address code memory 44. When the user is available, or desires to respond to the previously received messages, the user can manually interrogate the address memory 44 by successively depressing a keyboard switch 52 to retrieve, and transfer each stored code address from memory 44 to the address counter 40 to, in turn, retrieve and display the call-back numbers on the video display panel 43.

Alternatively, there is provided an automatically operating play-back circuit that is initiated by a different keyboard switch 59 to automatically retrieve from memory 44 and successively display each of previously received messages from the transmitter station. This is performed by providing a low frequency clock 54 and time delay circuit 55 for automatically operating the interrogate circuit 53 for the address memory 44. Upon depressing the automatic play-back switch 59, the clock 54 and time delay 55 automatically and successively pulse the interrogate circuit 53 to retrieve, in time succession, each previously stored address code in memory 44 and play-back each code over line 56, in time delayed fashion, to the address counter 40 for successively displaying each corresponding received message in the message memory 41. It will be appreciated by those skilled in the art, that the interrogate circuit 53 provides for automatic resetting and erasure of the receiver after each message is retrieved and displayed as discussed above.

As previously described in U.S. Pat. No. 4,197,526, the user of the pager receiver may acknowledge receiving each message from the transmitting station, to, in turn, inform the original caller that the message has been received and noted. This is performed by the use of the keyboard switch 60 for energizing a miniature single frequency acknowledgement transmitter 61 that is incorporated as part of the receiver.

Manual operation of the switch 60 energizes the portable transmitter 61 to send an acknowledgement transmission back to the central transmitter station where it is received by receiver 23 (FIG. 1) and employed to energize a prerecorded playback message at 13 to the Calling party, informing the Calling party that the page message has been received. It will be appreciated that the acknowledgement switch 60 may be the same keyboard switch as switch 48 that is used to erase the message code from address memory 44, as described above. However, it is often desired that the Calling party be informed that the message has been received, while at the same time retaining the message code in the memory 44. Consequently, where it is desired to provide both functions independent of one another, the use of separate switches 48 and 60 is preferred.

In the event that it is desired to automatically acknowledge receiving and storing each limited content message without any action on the part of the user of the receiver, this can be performed by coupling the acknowledgement transmitter 61 for energization automatically upon entry of each received code address into the memory 44. Referring to FIG. 2, there may be provided an additional keyboard switch 63 and self-resetting auto latch circuit 62, for coupling the acknowledgement transmitter 61 to the AND circuit 37 over line 64. As will be recalled, the AND circuit 37 sequentially conveys the received pulses representing the message code to be stored in the Address memory 44. Therefore when switch 63 is closed, the initial pulse of any received message code is also directed to trigger the self-resetting latch 62 to, in turn, provide a fixed time modulation of the transmitter 61, thereby to send out an acknowledgement signal in an automatic fashion. As each message code is received and stored, an acknowledgement signal is automatically transmitted by the receiver back to the transmitting station of FIG. 1.

As will be appreciated by those skilled in the art, the entire pager receiver, with the sole exception of the address memory 44, is reset after each message code is received from the transmitter. This may be performed either automatically in response to operation of a time delay circuit, or manually by depressing a keyboard switch. As will be noted it is preferred that all of the various functions of resetting, erasing, acknowledging, and others, are preferably performed by the use of separate circuits that are each individually activated by closure of a different keyboard switch. This provides the user with greater versatility, enabling the user to program the receiver for either manual or automatic operation in various modes.

It is intended and desired that the electronic pager receiver be small, compact, and easily portable to be carried by the user. The advances in the storage capacity of very small electronic memories 41, has increased so rapidly in recent years that the receiver may now be easily provided with a memory 41 having a sufficient storage capacity for prestoring many limited content messages. In addition to the user's storing a number of different call-back telephone numbers, other limited content messages are intended to be stored. For example, in the event that the Calling party dials a call-back number that is not one of those numbers that has been previously stored in the message memory 41, this fact is automatically determined at the transmitter station and a corresponding message code address is sent to the pager receiver having it retrieve and display a message such as "other" or the like, to inform the user to call back the Central station transmitter to receive a message or a number that is not in storage. Alternatively, the retrieval of a pre-stored message such as "other" may be employed to condition other portions of the pager receiver to receive, display, and/or store an entire limited message sent by the transmitter station.

Figure 3:
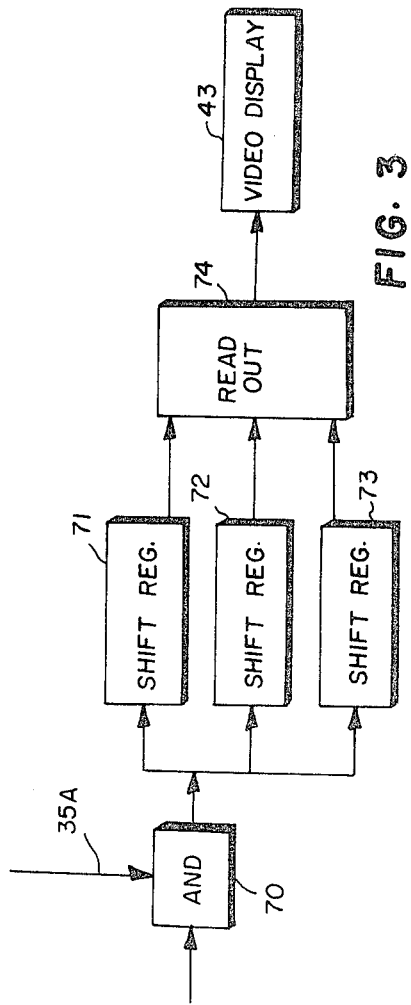
FIG. 3 is a functional block diagram illustrating a modification for receiving an entire limited content message.

Referring to FIG. 3, for a functional illustration of this auxiliary mode-of-operation, for transmitting and displaying an entire message, the reception of a message code address, such as "other", is directed to a series of AND circuits 70 to enable these circuits for subsequent transmission of a complete coded message from the transmitter station. The digital words or numbers subsequently transmitted in sequential pulse form from the transmitter station and received over line 35a are then entered and stored in a bank of shift registers 71, 72, and 73 and are subsequently read-out and displayed on the video panel 42. In this manner, limited messages that are not pre-stored in the message memory 41 may be transmitted in their entirety to the pager receiver and visually displayed on panel 43.

I claim:

1. In a portable carried radio pager receiver having a video display for visually displaying a message, a memory for storing a series of limited content messages, and selectively controllable means actuatable from a remote transmitter to retrieve previously stored messages from the memory for visual display, the improvement comprising:

means enabling the previous entry of said series of limited content messages into the memory for pre-storing said messages, with each such message assigned a unique retrieval address code having fewer digits than the number of digits in the message, and said controllable means responsive to receipt of one of said address codes to selectively retrieve the associated pre-stored message from the memory and applying that message to the video display for visual presentation.

2. In the receiver of claim 1, an additional memory for storing each of said received address codes, and means controllable by a user to selectively retrieve a stored address code to, in turn, retrieve and display the message associated there-with.

3. In the receiver of claim 2, automatically operating means initiated by a user to sequentially retrieve in time delayed fashion each of said stored address code to, in turn, automatically retrieve and display each of the prestored messages associated therewith.

4. In the receiver of claim 2, means for automatically erasing said video display and resetting said pager receiver after visual display of each pre-store message but retaining the received address codes in said additional memory.

5. In the receiver of claim 3, the addition of means for automatically erasing each of the address codes in the additional memory after each code has been retrieved and its corresponding message has been displayed.

6. In the receiver of claim 1, an acknowledgement transmitter as part of said receiver, and means for energizing said transmitter to propagate an acknowledgement signal to said remote transmitter.

7. In the receiver of claim 6, automatically operating means responsive to receiving each transmission from the remote transmitter for automatically energizing said acknowledgement transmitter to send back an acknowledgement signal.

8. In the receiver of claim 1, said control means including means responsive to each received message code to visually display the corresponding pre-stored message for a fixed time interval and then automatically erasing said visual display while remembering the received message code, and signaling means for alerting a user of each transmission received from the remote transmitter and resetting said signaling means after a fixed time interval.

* * * * *